United States Patent
Zhu et al.

(10) Patent No.: US 9,491,611 B2
(45) Date of Patent: Nov. 8, 2016

(54) METHOD AND DEVICE FOR RECEIVING SYSTEM INFORMATION

(71) Applicant: ZTE CORPORATION, Shenzhen, Guangdong Province (CN)

(72) Inventors: Jianjian Zhu, Shenzhen (CN); Feng Xie, Shenzhen (CN); Yu Ngok Li, Shenzhen (CN); Yuqin Chen, Shenzhen (CN); Yang Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/395,537

(22) PCT Filed: Jul. 1, 2013

(86) PCT No.: PCT/CN2013/078608
§ 371 (c)(1),
(2) Date: Oct. 20, 2014

(87) PCT Pub. No.: WO2013/185659
PCT Pub. Date: Dec. 19, 2013

(65) Prior Publication Data
US 2015/0079981 A1     Mar. 19, 2015

(30) Foreign Application Priority Data

Jul. 13, 2012 (CN) .......................... 2012 1 0243560
Aug. 3, 2012 (CN) .......................... 2012 1 0275293

(51) Int. Cl.
*H04W 4/00*     (2009.01)
*H04W 8/06*     (2009.01)
(Continued)

(52) U.S. Cl.
CPC ............... *H04W 8/06* (2013.01); *H04W 24/08* (2013.01); *H04W 48/16* (2013.01); *H04W 36/0061* (2013.01)

(58) Field of Classification Search
CPC ............... H04W 48/16; H04W 24/04; H04W 36/0072; H04W 36/0077; H04W 48/12; H04W 48/10
USPC ......................................................... 455/434
See application file for complete search history.

(56) References Cited

U.S. PATENT DOCUMENTS

2010/0069076 A1    3/2010 Ishii et al.
2010/0091750 A1    4/2010 Lee et al.
(Continued)

FOREIGN PATENT DOCUMENTS

CN     101990257 A     3/2011
CN     101990260 A     3/2011
(Continued)

OTHER PUBLICATIONS

English Translation of IPR on Patentability Chapter I for PCT/CN2013/20150113 , Jan. 13, 2015.*
(Continued)

*Primary Examiner* — Nader Bolourchi
(74) *Attorney, Agent, or Firm* — Ling Wu; Stephen Yang; Ling and Yang Intellectual Property

(57) ABSTRACT

The embodiments of the present document provide a method and apparatus for receiving system information. The method includes: a UE receiving system information and/or system information updating indication of a serving cell and/or a neighboring cell according to system configuration, including: receiving the system information and/or the system information updating indication of the serving cell and/or the neighboring cell from other locations except a fixed location configured by the system. By using the method and the apparatus provided by the embodiments of the present document, the user terminal can receive the system information from other locations except the fixed location configured by the system, thereby solving the problem in the related art that the user terminal cannot obtain the system information due to interference in the system information at the fixed location.

12 Claims, 8 Drawing Sheets

(51) Int. Cl.
  *H04W 48/16*   (2009.01)
  *H04W 24/08*   (2009.01)
  *H04W 36/00*   (2009.01)

(56) References Cited

U.S. PATENT DOCUMENTS

| | | |
|---|---|---|
| 2010/0317343 A1 | 12/2010 | Krishnamurthy et al. |
| 2012/0069756 A1 | 3/2012 | Ji et al. |
| 2012/0106465 A1 | 5/2012 | Haghighat et al. |

FOREIGN PATENT DOCUMENTS

| | | |
|---|---|---|
| CN | 102523186 A | 6/2012 |
| JP | 2010506446 A | 2/2010 |
| JP | 2012104959 A | 5/2012 |
| JP | 2011527877 A | 10/2012 |
| JP | 2012523773 A | 10/2012 |
| JP | 2013526154 A | 6/2013 |

OTHER PUBLICATIONS

Amended claims field after receipt of (European) search report for EP 13804297, Oct. 20, 2014.*
Invitation to clarify the claimsthe subject matter of the application for EP 13804297, Jun. 5, 2015.*
Reply to the invitation to clarify the claimsthe subject matter of the application for EP 13804297, Aug. 4, 2015.*
Supplementary Partial European Search Report for EP 13804297, Jan. 15, 2016.*
European Search Opinon for EP 13804297, Jan. 15, 2016.*
Report of email discussion on resource configuration; Samsung; 3GPP TSG-RAN2 RPC Ad Hoc meeting, Sophia-Antipolis, France, Jun. 5-6, 2008. R2-082952.

* cited by examiner

METHOD AND DEVICE FOR RECEIVING SYSTEM INFORMATION

TECHNICAL FIELD

The present document relates to the wireless communication technology field, and in particular, to a method and apparatus for receiving system information.

BACKGROUND OF THE RELATED ART

In the wireless cellular communications system, the base station is the equipment providing the wireless access for the user equipment (UE), and one base station may include one or more serving cells. The cell can provide the communication service for the UE in a certain geographical range, and there may be different coverage range for different cells. The cells can usually be classified as a macro cell, a Pico cell, a Femto cell and so on according to the coverage range of cell and the deployment purpose, and accordingly the base stations providing the user access services of these cells can be called as the macro base station, the Pico base station, the home base station, etc. The cells can also have different access methods: usually an ordinary cell can provide the access service for any user, and this kind of cell is called as an open cell; while for the demand to limit the users which are allowable for access under the application environment, such as, family or enterprise, etc., a closed subscriber group (CSG) cell (called the closed cell) can only allow the access of specified users (that is, members); or a hybrid cell can also provide the access services for the non-member users when preferably providing the access to the member users.

With the development of the wireless communication network technology, the scenarios that two or more types of cells cover the same or neighboring area will appear. For example, the Pico Cell is deployed in the coverage range of the Macro Cell for load balancing or coverage enhancement, and as another example, family users will also deploy the Femto Cell in the coverage range of the Macro Cell for indoor coverage. The scenarios that the wireless access coverage is provided by multiple types of cells together can be called as heterogeneous network (abbreviated as HetNet) scenarios. Under the heterogeneous network scenario, some new network deployment solutions and technologies immerge continuously; for example, in order to let the Pico Cell serve more users and then carry more service flows, it will introduce the Cell Range Extension (CRE) technology. For the users within the cell range extension area, the interference from the Macro Cell is relatively large. In order to reduce the interference to the Pico cell, under the heterogeneous network scenario that the Macro Cell and the Pico Cell coexist, it will introduce an Almost Blank Subframe (ABS) which reduces the transmission power. To reduce the interference to the neighboring Pico cell, the Macro cell will try to avoid or reduce the power to transmit the downlink service data in the Physical Downlink Shared Channel (PDSCH) on the ABS.

Introducing the ABS can partly reduce the interference from the interference cell to the data transmission of the UE located at the interference-sensitive location, such as, the above-mentioned CRE area, and served by the interfered cell, but there is no method to solve the interference to the transmission of some special messages, such as, the interference to the transmission of the system message. According to the design of the relevant technology, the transmission time domain location of the system message (including the Master Information Block (MIB) and other System Information Block (SIB) system message) has already been fixedly configured by the system, and the transmission frequency domain location of the MIB message is further fixedly configured by the system. In the Long Term Evolution (LTE) system, the MIB message is fixedly sent in the first 4 symbols of the first slot of the radio frame in both the Frequency Division Duplexing (FDD) and the Time Division Duplexing (TDD) systems, and it occupies the central 6 Physical Resource Blocks (PRB) of the system bandwidth in the frequency domain. The System Information Block 1 (SIB1) is fixedly configured by the system to be transmitted in the fifth subframe of the radio frame of even number in the FDD and TDD systems. In order to guarantee that the UE served by the interference cell can receive the service normally, even if it will cause the interference to the transmission of the system message of the interfered cell, the interference cell has to transmit the system message at the fixed location with the normal power according to the system configuration. It can be seen from the above analysis, in the related art, the transmission interference among the system messages is unable to be solved through introducing the ABS mechanism. In the above-mentioned CRE area, when receiving the system message of the interfered cell, the UE served by the interfered base station will receive the strong interference from the interference cell which causes that it is unable to receive the system message and the corresponding update of the system message normally sent by the interfered cell. The abnormal reception of system message will cause that the reception service of UE is influenced seriously in the network.

There is no research for the above-mentioned problem and corresponding solution at present.

SUMMARY

In view of this, the embodiments of the present document provide a method and apparatus for receiving system information, which solves the problem that the UE in the interfered area cannot receive the system message from the fixed location of the serving cell due to the interference of the neighboring cell.

The embodiments of the present document provide a method for receiving system information, comprising:

a user equipment (UE) receiving system information and/or system information updating indication of a serving cell and/or a neighboring cell from other locations except the fixed location configured by a system.

The embodiments of the present document further provide a user equipment, comprising:

a receiving module, configured to receive system information and/or system information updating indication of a serving cell and/or a neighboring cell from other locations except the fixed time domain and/or frequency domain location configured by a system.

The embodiments of the present document further provide a base station, comprising:

a transmitting module, configured to: send system information and/or system information updating indication of a serving cell and/or a neighboring cell of a user equipment from other locations except the fixed time domain and/or frequency domain location configured by a system to the UE.

The embodiments of the present document further provide another method for receiving system information, comprising:

a UE receiving auxiliary information required by an interference elimination operation from a serving cell; and the UE performing the interference elimination operation during an operation of receiving system information according to the auxiliary information.

The embodiments of the present document further provide another UE, comprising:

a receiving unit, configured to: receive auxiliary information required by an interference elimination operation from a serving cell; and an interference elimination unit, configured to: perform the interference elimination operation during an operation of receiving system information according to the auxiliary information.

By using the method and the apparatus provided by the embodiments of the present document, the user equipment can receive the system information from other locations except the fixed location configured by the system, thereby solving the problem in the related art that the user terminal cannot obtain the system information due to interference of the system information at the fixed location.

PREFERRED EMBODIMENTS OF THE PRESENT DOCUMENT

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

Figure 1:
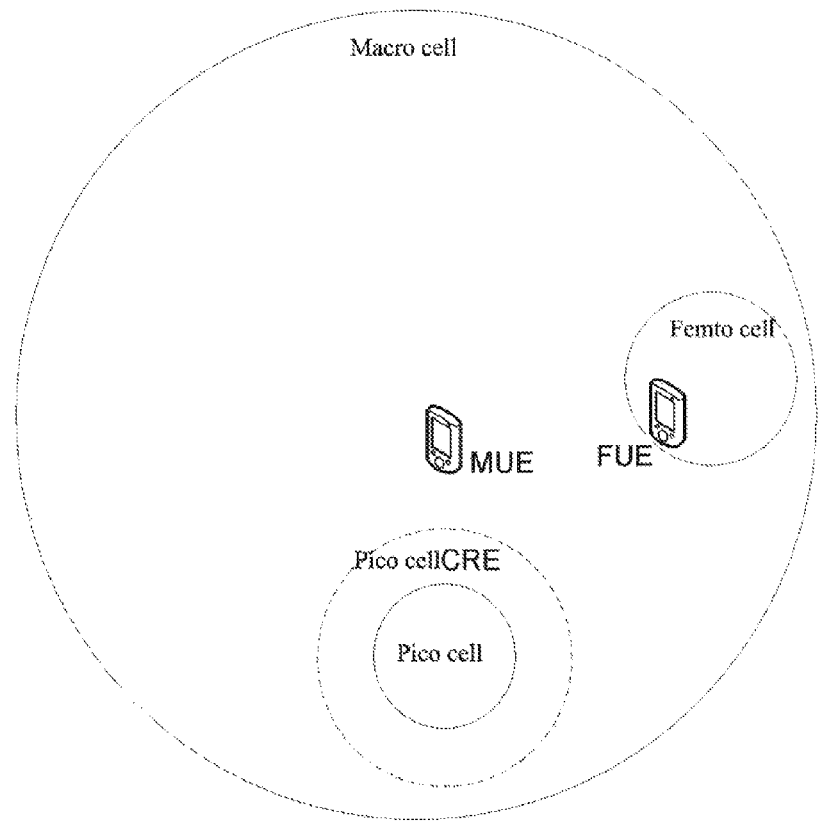
FIG. 1 is a coverage diagram of a heterogeneous network.

FIG. 1 is a coverage diagram of a heterogeneous network. As shown in FIG. 1, one typical heterogeneous network scenario includes a Macro Cell and a Pico Cell and a Femto Cell. Wherein, the CRE mechanism is applied in the coverage area of the Pico Cell in order to improve the coverage range of the Pico Cell. In order to protect the data transmission of the UE served by the Pico and located in the Pico CRE area and the data transmission of the UE served by the Macro and located in the Femto coverage area, the system will introduce the ABS. By introducing the ABS, it can reduce the interference by the interference cell to the data transmission of the UE served by the interfered cell and located in the interference location, for example, the UE in the CRE area as shown in the figure. But for the transmission of the information scheduled by some downlink common control channels of the interference cell, such as, the system message, since the interference cell needs to guarantee that the UE served by itself is not influenced, even if the subframe transmitted by the system message is configured as the ABS, the system message needs to be transmitted in the ABS normally as well. And then, in the above-mentioned CRE area, the UE served by the interfered base station will receive the strong interference brought by the interference cell transmitting the system information when receiving the system message of the interfered cell, and then it causes that it cannot receive the system message sent by the interfered cell and the update of the corresponding system message normally. The abnormal reception of the system message will cause that the UE will be influenced seriously while receiving the service in the network.

The technical scheme of the present document is described in details by combining the specific embodiments hereinafter.

Embodiment One

Figure 2:
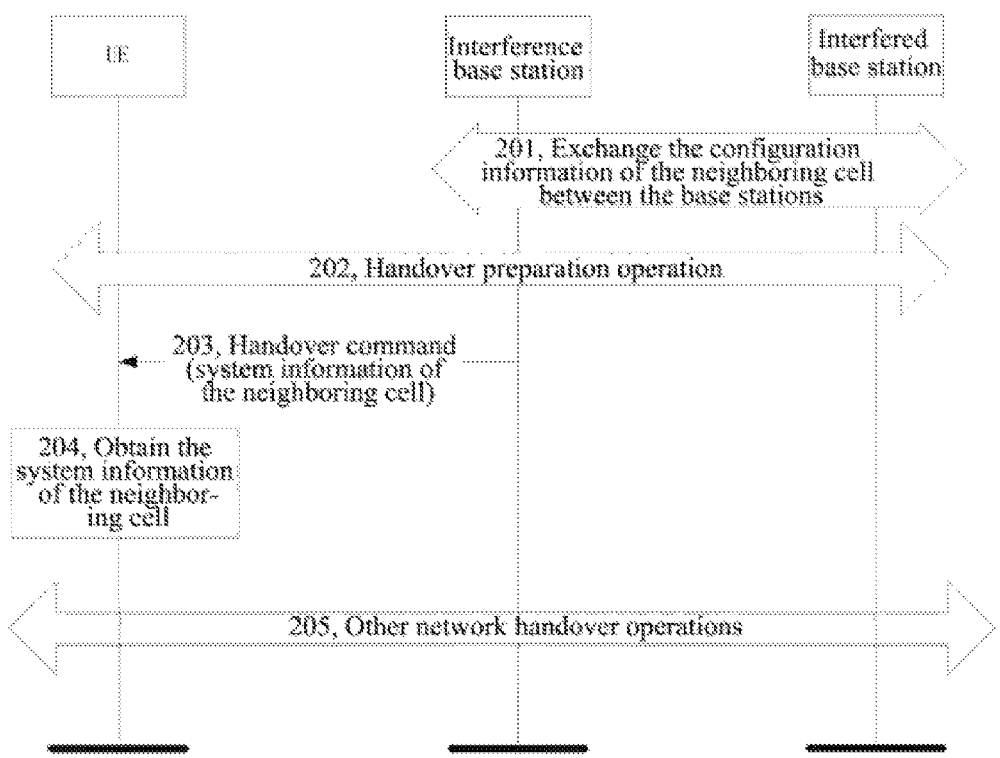
FIG. 2 is an operational flow chart of receiving a system message during a UE handover operation according to embodiment one of the present document.

The method for receiving system information provided by embodiment one of the present document is applied to the user equipment handover scenario. The serving cell is the interference cell, and the neighboring cell is the interfered cell, and as shown in FIG. 2. the handover process includes the following steps.

In 201, the base station to which the interference cell belongs (called the interference base station hereafter) and the base station to which the interfered cell belongs (called the interfered base station hereafter) exchange the configuration information of the neighboring cells.

The interference cell includes the Macro Cell under the heterogeneous network scenario, and the interfered cell includes the Pico Cell under the heterogeneous network scenario.

The configuration information of the neighboring cells includes the configuration parameters of expanding the service range of the cell configured by the base station. The parameters include a parameter reflecting the scale of cell range extension mechanism applied by the interfered cell and/or a cell-specific offset parameter for requesting the neighboring cell to control the UE handover and/or the version information of the base station to which the cell belongs and/or an indication to request the opposite cell to transmit information required by the UE receiving the system information of the present cell.

Taking the Macro-Pico scenario as an example, the above-mentioned configuration parameter can be the configuration parameter of the Pico cell applying the CRE mechanism, for example, a relative threshold between an strength of a reference signal of the Pico cell detected by the UE in the configured CRE area of the Pico cell and the signal strength of the macro cell detected by the UE, or a power value and/or a relation parameter reflecting the scale of the Pico applying the CRE mechanism, or the cell-specific offset parameter that the macro or the Pico controls the UE to be handed over to the neighboring Pico or macro, or the version type of the Pico cell; the reason for exchanging the version type herein is to suppose that the Pico base station of different versions will be limited to apply the configuration parameter of a certain range of the CRE mechanism, for example, the Pico base station of the R11 version will apply the parameter configuration of the scale of CRE mechanism which is higher than the one applied by Pico base station of the R10 version, that is, the Pico base station of the R11 version will be configured to apply a larger range of the CRE area.

The above-mentioned indication method of requesting the opposite cell to transmit the information, required by the UE receiving the system information of the present cell can be that: when A and B are the neighboring cells, if the UE served by A is handed over to cell B from cell A and it needs to perform the operation based on the assistance of A in the subsequent steps of the present embodiment, such that the UE is able to obtain the system message of the cell B, B can use the indication signaling in the operation step to indicate A, and then it makes A know that A needs to perform the subsequent operation steps in the present embodiment in the subsequent operation process that the UE served by itself is handed over to the cell B.

The base stations can also exchange the current system frame numbers between the neighboring cells or the relation between the system frame numbers of the neighboring cells, and the relation includes a difference and/or multiple relation; the base station obtains the relation between the system frame numbers of the neighboring cells includes the following methods:

the UE receives the system frame numbers of the serving cell and the neighboring cell, and reports the system frame numbers of the serving cell and the neighboring cell or the system frame numbers of the serving cell and the neighboring cell and/or the relation between the system frame numbers to the serving base station, and the relation includes the difference and/or multiple relation;

the network manages the base station configured by the system in order to make the base station know the current system frame numbers of the neighboring cells or the relation between the system frame numbers of the neighboring cells.

The methods of the base station exchanging the configuration information of the neighboring cell includes: the interference base station and the interfered base station exchange the configuration information of the neighboring cell through an X2 interface and/or an Operation Administration and Maintenance (OAM) interface; the method through the X2 interface includes transmitting through an existing and/or newly-added public message and/or an existing and/or newly-added private message on the X2 interface; the public message includes an X2 interface establishment exchange message (X2 Setup Request/X2 Setup Response), a base station configuration update message (eNB Configuration Update/eNB Configuration Acknowledge), load indication information (Load Information), a resource status exchange message (Resource Status Request/Resource Status Response/Resource Status Update) and the existing other public message on X2 interface; the private message includes a handover-related signaling message (Handover Request/Handover Acknowledge), an SN Status Transfer message, a UE Context Release message and the existing other private messages on X2 interface; the exchanging method of the interference base station and the interfered base station includes: a method that the interfered base station transmits the data required to be exchanged between the above-mentioned base stations to the interference base station proactively, or a method of responding based on the request indication information that is transmitted by the interference base station to the interfered base station to request for the data required to be exchanged between the above-mentioned base stations, and/or, a method that the interference base station transmits the data, required to be exchanged between the above-mentioned base stations, to the interfered base station proactively, or a method of responding based on the request indication information that is transmitted by the interfered base station to the interference base station to request for the data required to be exchanged between the above-mentioned base stations. It is explained here that all the interference cell receiving and/or sending the message involved in the following description includes the interference cell receiving and/or sending the message based on the interference base station, and the interfered cell receiving and/or sending the message includes the interfered cell receiving and/or sending the message based on the interfered base station. And all the exchanges between the base stations include the exchanging method of mutual requests and responses between the pair of base stations described here.

It should be illustrated that the aforesaid is introduced by taking the relevant information of the X2 interface as an example, and the method can also be applied to the scenarios of other types of interfaces, and it is not limited by the embodiments of the present document.

In 202, the interference cell, the interfered cell and the UE served by the interference cell perform the handover preparation operation of the UE from the interference cell to the interfered cell.

The interference base station performs the exchange according to the handover operation mechanism defined in the existing system and the cell-specific offset parameter configured for the neighboring cell and/or the configuration of the neighboring base station in 201, and determines the neighboring interfered cell as the candidate target cell of the handover operation. And furthermore, the interference base station and the interfered base station exchange the signaling message required by the UE handover operation. The handover operation here includes the X2 handover operation procedure or the S1 handover operation procedure between the interference base station and the interfered base station.

In 203, a source cell and a target cell of the handover operation send the handover command message to the UE.

The source cell needs to send some information to the UE, and then make the UE obtain the system information of the neighboring target cell, and the system information here includes a MIB, a SIB1 and the system information sent by other target cells.

It includes the following methods for the UE to obtain the MIB information of the target cell.

(1), the source cell sends the system frame number of the target cell and/or the relation of the system frame numbers of the source cell and target cell and/or the correction parameter required by calculating and obtaining the system frame number of the target cell to the UE. The relation between the system frame numbers includes the difference and/or multiple relation between the system frame numbers of the source cell and target cell or other relations of the system frame numbers of the target cells which can be obtained based on the current system frame number of the source cell and the relation. When the UE receives the clear system frame number of the target cell and the system configures the corresponding correction rule, for example, a correction operation is introduced based on the known clear system frame number, then the current system frame number of the target cell can be known, and then the UE performs the corresponding correction operation in order to obtain the system frame number of the target cell. And/or, when what the UE receives is the relation between the system frame numbers, then the UE calculates and obtains the system frame number of the neighboring target cell based on the system frame number of the current serving cell and the relation between the system frame numbers. And, when what the UE receives is the correction parameter for obtaining the system frame number of the target cell and the relation, then the UE performs the operation and obtains the current system frame number of the target cell according to the correction parameter and the relation.

The UE can receive the system frame number and/or the relation between the system frame numbers from other Radio Resource Control (RRC) signaling messages except the broadcast message and/or the handover command sent by the serving base station; if the UE performs the reception from the broadcast message sent by the serving base station, then the system can configure the method that the UE obtains and receives the broadcast message from the serving base station; the method for receiving the broadcast message includes a time domain location and/or a frequency domain location and/or power information and/or scheduling information and/or transmission and reception of encoding and decoding information transmitted by the broadcast information, further including that the UE can obtain the method of receiving the broadcast message from the serving base station and receive the broadcast message according to the receiving method of the broadcast message; other RRC signaling except the handover command includes the radio connection reconfiguration message.

(2), if the cell configured by the system can send the system message at other locations except the current fixed location, for example, it is defined in the existing LTE system that the MIB message is fixedly sent in the first 4 symbols of the first slot of the radio frame both in the FDD and TDD systems and occupies central 6 PRBs of the system bandwidth in the frequency domain, and then the UE can receive the information of the method of obtaining the system message sent by the neighboring cell at other locations except the fixed location from the serving base station; the information of the method of sending the system message includes the time domain location and/or the frequency domain location and/or the power information and/or the scheduling information and/or the transmission and reception of encoding and decoding information for sending the system message; the transmission method includes the unicast RRC signaling message and/or the broadcast message; the UE can obtain the information of the method of the neighboring cell sending the system message at other locations except the fixed location from the serving base station based on the broadcast message and/or the unicast RRC signaling. After the UE obtains the information of the method of the neighboring cell sending the system message at said other locations, then the UE can receive the system message from the neighboring target cell according to the obtained method of the target cell sending the system message.

The UE obtains the SIB information (including SIB1 and other SIB modules) of the target cell, including the following methods:

if the cell configured by the system can send the system message at other locations except the current fixed location, for example, it is defined in the existing LTE system that the SIB1 is fixedly configured by the system to be transmitted in the fifth subframe of the radio frame of even number in both the FDD and the TDD systems. If the cell configured by the system can send the system message at other locations except the fixed location, then the UE can receive the information of the method of obtaining the system message sent by the neighboring cell at other locations except the fixed location from the serving base station; the information of the method of sending the system message includes the time domain location and/or the frequency domain location and/or the power information and/or the scheduling information and/or the transmission and reception of encoding and decoding information for sending the system message; the transmission method includes the unicast RRC signaling message and/or the broadcast message; the UE can obtain the information of the method of sending the system message by the neighboring cell at other locations except the fixed location from the serving base station based on the broadcast message and/or the unicast RRC signaling. After the UE obtains the information of the method of sending the system message by the neighboring cell at other locations, then the UE can receive the system message from the neighboring target cell according to the obtained method of sending the system message.

In 204, the UE obtains the system information of neighboring cell.

As various operation procedures described in 203, the UE obtains the MIB or other SIB information of the target cell through the unicast and/or the broadcast message of the serving cell and/or the neighboring cell.

In 205, the UE, the interference cell and the interfered cell finish other handover operations of the network.

Embodiment Two

Figure 3:
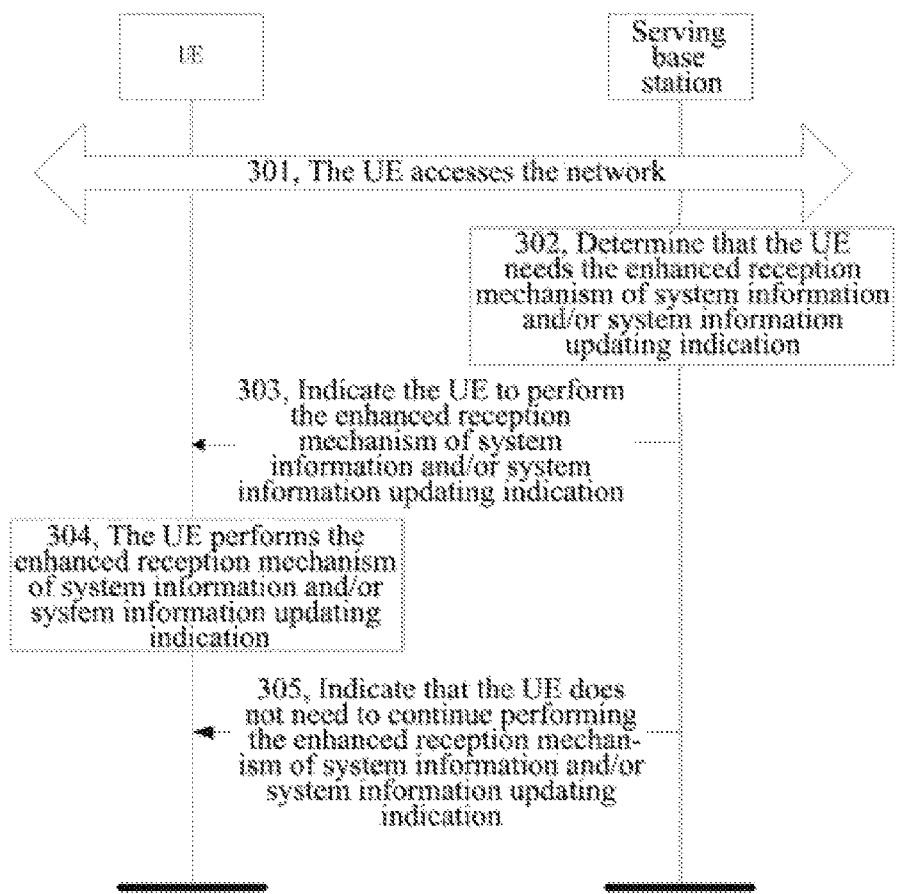
FIG. 3 is an operational flow chart of receiving a system message from a serving base station according to embodiment two of the present document.

The method for receiving the system information and/or the system information updating indication provided by the embodiment two of the present document is applied to the scenario that the UE receives the system information and/or the system information updating indication from the serving cell, as shown in FIG. 3, which includes the following steps.

In 301, the UE accesses the network.

The operation includes the scenarios of various network accesses, such as the handover access, initial access, reestablishment access of the UE, etc.

In 302, the serving base station determines that the UE needs the enhanced reception mechanism of system information and/or system information updating indication.

After the UE accesses the network, due to the change of the channel state of the UE receiving the signal, for example, the UE may enter the strong interference area of the neighboring cell because of the movement, and the UE may be unable to reach the requirement of the system for receiving the system information and/or the system information updating indication.

The serving base station can judge the measurement result of the channel state based on the UE, and the measurement result of the channel state includes that the UE judges the measurement result of the Radio Resource Management (RRM) (including the Reference Signal Receiving Power (RSRP) and the Reference Signal Receiving Quality (RSRQ)) and/or the Radio Link Management (RLM) and/or the Channel quality indicator (CQI) and/or the Signal to Noise Ratio (SNR) and/or the Signal to Interference plus Noise Ratio (SINR) of the serving base station. When the measurement result is lower than the threshold value configured by the system, then the serving base station can determine that the UE needs to perform the enhanced reception mechanism of system information and/or system information updating indication; when the measurement result is higher than a corresponding threshold value configured by the system, then the serving base station can determine that the UE does not need to perform the enhanced reception mechanism of system information and/or system information updating indication. The serving base station also can make a judgment based on the data transmission and reception success situation of the UE; when the data transmission and reception success rate of the UE is lower than the threshold value configured by the system, then the serving base station can determine that the UE needs to perform the enhanced reception mechanism of system information and/or system information updating indication; when the data transmission and reception success rate of the UE is higher than the corresponding threshold value configured by the system, then the serving base station can determine that the UE does not need to perform the enhanced reception mechanism of system information and/or system information updating indication.

In 303, the serving base station indicates the UE to perform the enhanced reception mechanism of system information and/or system information updating indication.

Based on the step of 302, when the serving base station determines that the UE needs to perform the enhanced reception mechanism of system information and/or system information updating indication, then the serving base station needs to send the corresponding RRC message including the indication information to the UE in order to indicate the status of the UE that it needs to perform the enhanced reception mechanism of system information and/or system information updating indication. The RRC message can be an existing RRC signaling, including wireless connection reconfiguration information, and also can be a newly-added RRC message. The indication information can be adding a new clear information element (IE) in the existing message, and it also can be indicating by using the existing information element; for example, when the UE configured by the system measures the constraint information, including measuring the constraint information of the RLM and/or the RRM and/or the CQI and/or the SNR and/or the SINR of the serving cell and/or the neighboring cell, then it shows that the serving base station indicates that the UE needs to perform the enhanced reception mechanism of system information and/or system information updating indication at the same time.

If the enhanced reception mechanism of system information and/or system information updating indication is that the UE needs to receive the system information and/or the system information updating indication broadcasted by the serving base station at other locations except the existing fixed location configured by the system, then the serving base station can also transmit, in that step, the method of receiving the broadcasted system message at other locations except the fixed location which is obtained by UE from the serving base station. The method of receiving the broadcasted system message includes the time domain location and/or the frequency domain location and/or the power information and/or the scheduling information and/or the transmission and reception of encoding and decoding information broadcasted and transmitted by the system information.

In 304, the UE performs the enhanced reception mechanism of system information and/or system information updating indication.

The UE performs the enhanced reception mechanism of system information and/or system information updating indication, including the several following methods:

1), the UE tries to receive the system information and/or the system information updating sent by the serving cell in the fixed location and receive the system information and/or the system information updating indication sent by the serving cell in the location except the fixed location at the same time, including the information included in the MIB and/or the System Information (SI) message;

2), the UE determines that the status is the status that it cannot receive the system information and/or the system information updating indication broadcasted and sent by the serving cell at the fixed location, then the UE does not try to decode and receive the physical control channel and/or downlink data sharing channel corresponding to the system information and/or the system information updating indication broadcasted and sent by the serving cell at the fixed location.

If the UE obtains the method of receiving the broadcasted system information and/or system information updating indication transmitted from the serving base station at other locations except the fixed location in 303, then the UE receives the broadcasted system information and/or system information updating indication transmitted by the serving base station at other locations except the fixed location according to its obtained information of the method of receiving the broadcasted system information and/or system information updating indication transmitted at other locations except the fixed location.

When the UE receives the relation between the system frame numbers of the current serving cell and neighboring cell, it will obtains the current system frame number of the neighboring cell based on the configuration of the serving base station or voluntarily. The configuration of the serving base station includes that the serving base station needs to clearly configure the cell identity of the neighboring cell corresponding to the relation of the system frame numbers and the measurement configuration information regarding the neighboring cell. The UE calculates and obtains the current system frame number of the serving cell based on the currently received system frame number of the neighboring cell and the relation between the system frame numbers; the calculation method can be the method described in the aforesaid embodiment.

In 305, the serving base station indicates that the UE does not need to continue performing the enhanced reception mechanism of system information and/or system information updating indication.

As the method in 302, the serving base station can continue judging whether the UE needs to continue performing the enhanced reception mechanism of system information and/or system information updating indication.

When the serving base station determines that the UE does not need to continue performing the enhanced reception mechanism of system information and/or system information updating indication, then the serving base station can send the RRC signaling including the clear or indirect indication information to the UE; the RRC signaling includes the wireless connection reconfiguration message; the clear indication information includes adding the information element in the RRC signaling or using the existing information element for indirect indication. Preferably, when the UE receives the measurement constraint information which is released and configured for the UE by the serving base station, including the measurement constraint information of the RLM and/or the RRM and/or the CQI and/or the SNR and/or the SINR of the serving cell and/or the neighboring cell, then it shows that the serving base station indicates that the UE does not need to perform the enhanced reception mechanism of system information and/or system information updating indication at the same time. At this moment, when the serving base station transmits the system information and/or the system information updating indication to the UE based on the unicast method, then the serving base station stops transmitting the unicast system information and/or system information updating indication to the UE again; in the operation step of 304, when the UE does not receive the system information and/or the system information updating indication sent by the serving cell at the fixed location when performing the enhanced reception mechanism of system information and/or system information updating indication, then the UE needs to begin receiving the system information and/or the system information updating indication sent by the serving cell at the fixed location according to the method configured by the system when the UE receives the signaling message, indicated by the serving base station, that the UE does not need to continue performing the enhanced reception mechanism of system information and/or system information updating indication.

Embodiment Three

Figure 4:
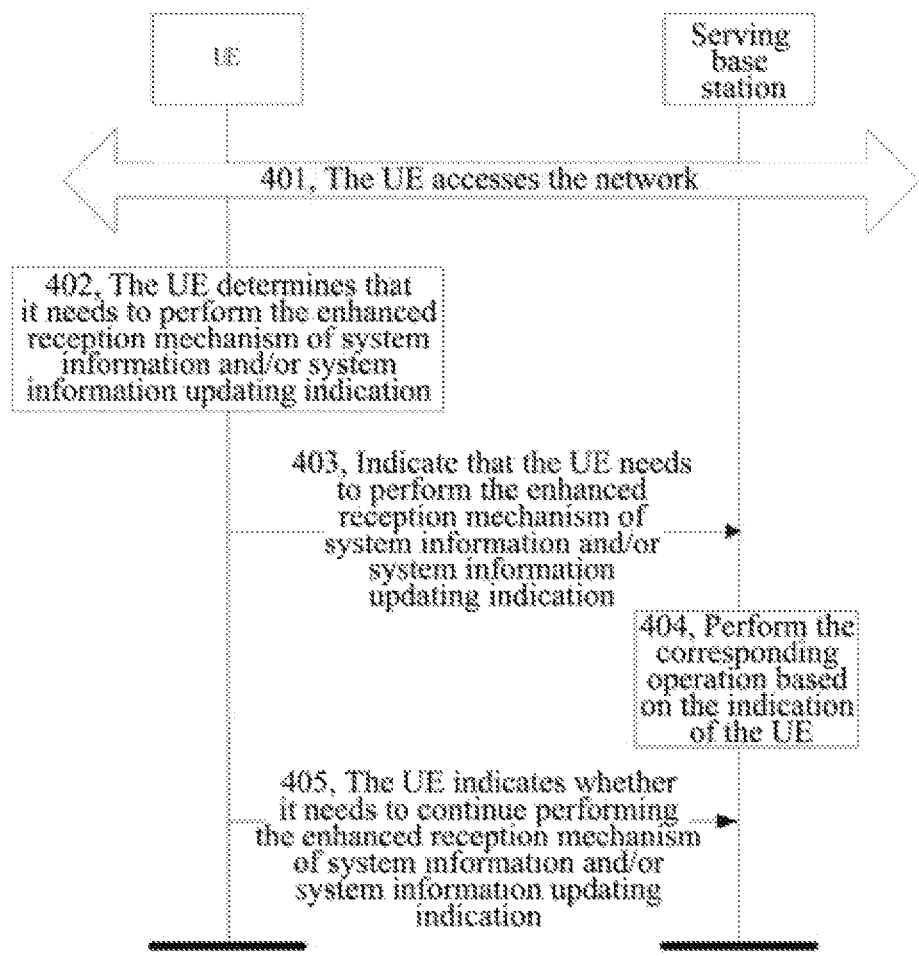
FIG. 4 is an operational flow chart of receiving a system message from a serving base station according to embodiment three of the present document.

The method for receiving the system information and/or the system information updating indication provided by the embodiment three of the present document is applied to another scenario that the UE receives the system information and/or the system information updating indication from the serving cell, as shown in FIG. 4, which includes the following steps.

In 401, the UE accesses the network.

The scenario to which the step is applied and the included operation content are same with that of the embodiment two, which will not be repeated here.

In 402, the UE determines that it needs to perform the enhanced reception mechanism of system information and/or system information updating indication.

After the UE accesses the network, due to the change of the channel state of the UE receiving the signal, for example, the UE may enter the strong interference area of the neighboring cell because of the movement, and the UE may be unable to reach the requirement of the system for receiving the system information and/or the system information updating indication of the serving base station.

The judgment method of the UE includes one of the following:

1), the channel state measured by the UE includes the measurement result of RRM and/or the RLM and/or the CQI and/or the SNR and/or the SINR as described in the aforesaid embodiments. If the measurement result of the UE meets the condition that it needs to perform the enhanced reception mechanism of system signal based on a judgment rule and a judgment threshold configured by the base station, then it is believed that the UE needs to continue performing the enhanced reception mechanism of system information and/or system information updating indication. Wherein, the judgment threshold is sent by the base station, and the transmission time is before the UE performs the judgment, for example, it is sent when the UE accesses the network. The method of the serving base station sending the judgment threshold includes the method of the broadcast transmission and/or unicast RRC signaling message transmission.

2), the probability that the UE succeeds in decoding the system information and/or system information updating indication transmitted by the serving cell at the fixed location is lower than the judgment threshold received by the UE from the serving base station.

In 403, the UE indicates the base station that the UE needs to perform the enhanced reception mechanism of system information and/or system information updating indication.

If in step 402, the UE determines that it needs to perform the enhanced reception mechanism of system information and/or system information updating indication, then the UE sends the signaling carrying direct or indirect indication information to the serving base station; the direct indication information signaling includes adding a new information element in the existing signaling message and/or the newly-added signaling message, and the indirect indication information signaling includes expanding the meaning of the existing information element and/or the existing information element combination in the existing RRC signaling message and/or the newly-added signaling message for indication.

In 404, the serving base station performs the corresponding operation based on the indication of the UE.

When the serving base station receives the status indication that UE cannot receive the system information and/or the system information updating indication broadcasted and transmitted by the serving cell at the fixed location, and when the serving base station determines that the subsequent UE needs to obtain the system information and/or the system information updating indication, for example, the system information and/or the system information updating indication are updated, the system information and/or the system information updating indication are sent to the UE by using the unicast and/or broadcast message transmitted at other locations except the fixed location.

It should be illustrated that if the serving base station sends the system information and/or the system information updating indication by the way of broadcasting, then the serving base station also needs to inform the UE of the method of broadcasting the system information and/or the system information updating indication, including the time domain location and/or the frequency domain location and/or the power information and/or the scheduling information and/or the transmission and reception of encoding and decoding information transmitted by the broadcast information.

In 405, the UE indicates whether it needs to continue performing the enhanced reception mechanism of system information and/or system information updating indication.

After the UE performs the operation in step 403, that is, after it sends the indication that the UE needs to perform the enhanced reception mechanism of system information and/or system information updating indication to the serving base station, it can also continue performing the judgment whether the UE needs to perform the enhanced reception mechanism of system information and/or system information updating indication, and the specific judgment operation is as follows:

The judgment method of the UE includes one of the following:

1), the channel state measured by the UE includes the measurement result of RRM and/or the RLM and/or the CQI and/or the SNR and/or the SINR as described in the aforesaid embodiments. If it is higher than a certain threshold, then it is believed that the UE does not need to continue performing the enhanced reception mechanism of system information and/or system information updating indication.

2), the UE tries to receive the system information and/or the system information updating indication transmitted and sent by the serving cell at the fixed location and other locations except the fixed location at the same time, then the UE can judge and indicate the serving cell whether it is the status of receiving the system information and/or the system information updating indication sent by the serving cell at the fixed location in the broadcasting way. If the probability that the UE succeeds in decoding the system information and/or system information updating indication transmitted by the serving cell at the fixed location is higher than the judgment threshold configured by the system, then it is believed that there is no need to continue performing the enhanced reception mechanism of system information and/or system information updating indication.

When the UE determines that it does not need to continue performing or determines that it needs to continue performing the enhanced reception mechanism of system information and/or system information updating indication, then it also can use the RRC signaling and/or the random access code to indicate the status information to the serving base station. The method for carrying the indication signaling can be same with the method in the above-mentioned embodiments.

It should be illustrated that the judgment processes in the above-mentioned embodiments two and three are not limited to the above-mentioned descriptions, for example, it also can be that the UE determines that it needs to perform the enhanced reception mechanism of system information and/or system information updating indication, while the serving base station determines that it does not need to continue performing the enhanced reception mechanism of system information and/or system information updating indication; or the serving base station determines that it needs to perform the enhanced reception mechanism of system information and/or system information updating indication, and the UE determines that it does not need to continue performing the enhanced reception mechanism of system information and/or system information updating indication. It is not limited by the embodiments of the present document.

Through adopting the method provided by the present document, the user equipment can receive the system information and/or the system information updating indication at other locations except the fixed location configured by the system, thereby solving the problem in the related art that the user equipment cannot obtain the system information and/or the system information updating indication due to interference in the system information and/or the system information updating indication at the fixed location.

Embodiment Four

Figure 5:
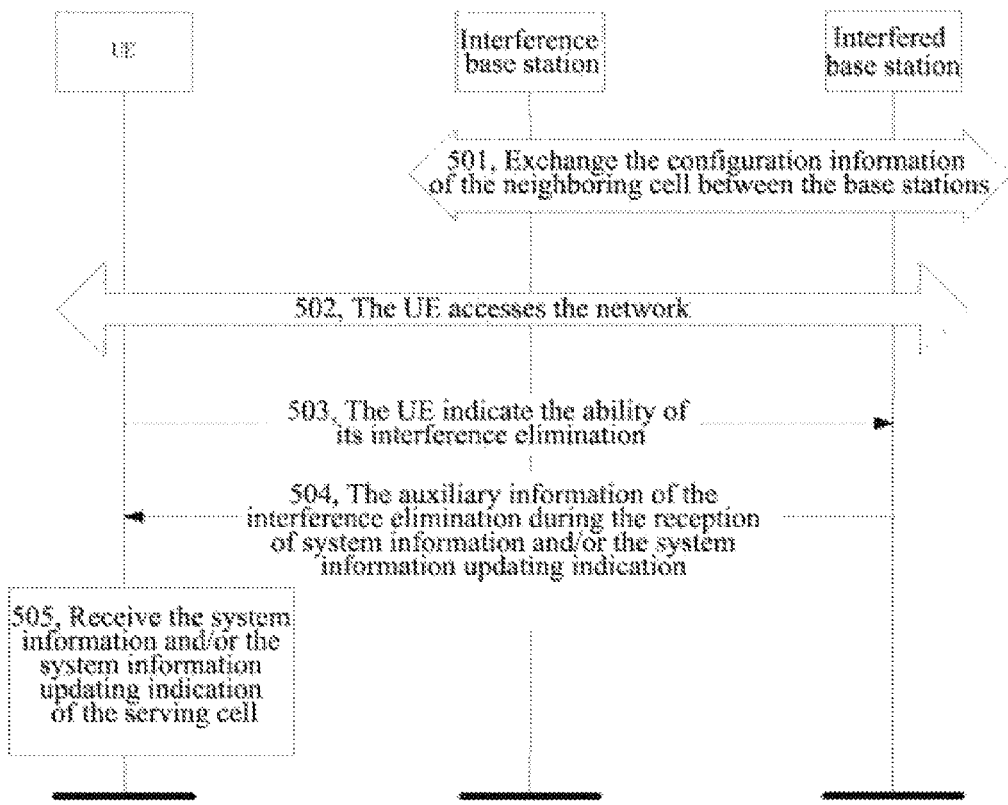
FIG. 5 is an operational flow chart of receiving a system message from a serving base station according to embodiment four of the present document.

Since the interference cell and the interfered cell send the system information and/or the system information updating indication according to the fixed location configured by the system, so the UE in the interfered area will receive the interference of the system information and/or the system information updating indication of the interference cell when receiving the system information and/or the system information updating indication of the interfered cell. Another method for receiving the system information provided by embodiment four of the present document receives the system information and/or the system information updating indication based on the interference elimination, as shown in FIG. 5, including the following steps.

In 501, the configuration information of the neighboring cell is exchanged between the base stations.

As described in the aforesaid embodiments, the configuration information of some base stations can be exchanged between the interference base station and the interfered base station. In the embodiment, the purpose of exchanging the information between the base stations is mainly for the subsequent interference elimination operation during the reception of the system information and/or the system information updating indication, so it mainly includes the following contents: exchanging the information transmitted by the physical broadcast channel (PBCH) of the neighboring cell between the base stations, including the downlink bandwidth and/or the physical feedback channel (PHICH) configuration and/or the physical frame number and/or the relation between the physical frame numbers of the neighboring cell and/or the code rate information and/or modulation encoding scheme used by the neighboring cell transmitting the information.

In 502, the UE accesses the network.

The scenario to which the step is applied and the included operation content are same with that of the aforesaid embodiment, which will not be repeated here.

In 503, the UE indicate the capability of its interference elimination to the serving base station.

The purpose of the step is to make the base station know that the UE possesses the interference elimination capability for the interference caused by the PBCH transmission of the neighboring interference cell when receiving the PBCH information of the serving cell, including the following methods:

1), the UE uses the RRC signaling including the independent capability indication information to the serving base station, which is included and carried in the signaling message of the UE Capability Information.

2), the UE uses other capabilities to indicate indirectly its interference elimination capability, such as, the version information of the UE, and the interference elimination capability of the interference reference signal of the neighboring interference cell of the UE can all be corresponding to the interference elimination capability of the UE when receiving the PBCH message.

3), when the UE receives the auxiliary signaling required by performing the interference elimination operation sent by the serving base station, the UE does not send the response message, or the UE sends the response message including that the interference elimination capability indication information is supported or not supported to the base station, to notify the base station that it does not support or supports the interference elimination capability; the method of the response message including the indication information can be expressed by using the above-mentioned direct and/or indirect method.

The serving base station can process the access capability according to the existing capability information processing mechanism after obtaining the interference elimination capability of the UE, including the operations, such as, transmitting the capability to the network element of the core network (including the Mobility Management Entity (MME)) and carrying the capability to the target base station during the handover operation process, etc.

In 504, the UE obtains the auxiliary information required by the interference elimination operation during the reception of the system information and/or the system information updating indication from the serving cell.

The serving cell in the step is the interfered cell in the heterogeneous network scenario, such as, the Pico cell in the Macro-Pico scenario. The Pico cell sends the information, obtained in 501, transmitted in the physical broadcast channel by the neighboring interference cell and the corresponding configuration information to the UE.

In 505, the UE receives the system information and/or the system information updating indication of the serving cell.

The UE performs the interference elimination operation when receiving the PBCH information of the serving cell based on the obtained information transmitted in the physical broadcast channel by the interference cell and the corresponding configuration information. The interference elimination operation includes the operation of removing the interference caused by the interference signal sent by the interference cell from the received signal. Preferably, the UE obtains the system information of the cell sent at the fixed location from the current serving cell.

The method described in the present embodiment can also be applied to the scenario that the UE is served by the interference cell but it needs to receive the system information and/or the system information updating indication of the interfered cell adjacent to multiple interference cells at the same time; the interference cell can send the information content transmitted in the PBCH by other interference cells adjacent to the interfered cell in order to assist the UE to perform the interference elimination operation when receiving the system information and/or the system information updating indication of the interfered cell. The interference cell obtains the information content transmitted in the PBCH by other neighboring interference cells directly through other interference cells adjacent to the interfered cell or indirectly through the interfered cell.

Embodiment Five

The embodiment of the present document further provides a method for the UE to receive the system information and/or the system information updating indication, including:

The UE receives the system information and/or the system information updating indication of the serving base station and/or the neighboring base station from the unicast message and/or the broadcast message of the serving base station.

Preferably, the UE receives the system information and/or the system information updating indication of the neighboring cell from the serving cell, and the UE receives the system frame number of the neighboring cell and/or the relation between the system frame numbers of the serving cell and the neighboring cell from the serving cell; the relation between the system frame numbers includes the difference and/or multiple relation between the system frame numbers of the neighboring cell and the serving cell.

Preferably, the UE receives the system frame number and/or the relation between the system frame numbers from the broadcast message and/or the RRC signaling message sent by the serving base station; the UE configured by the system obtains the method of receiving the broadcast message from the serving base station; the method for receiving the broadcast message includes a time domain location and/or a frequency domain location and/or power information and/or scheduling information and/or transmission and reception of encoding and decoding information transmitted by the broadcast information, and the UE obtains the information of the method of receiving the broadcast message from the serving base station; and the RRC signaling includes the wireless connection reconfiguration message and the handover command message.

Preferably, the UE receives the relation between the system frame numbers from the serving base station, calculates and obtains the system frame number of the neighboring cell based on the system frame number of the current serving cell and the relation between the system frame numbers.

Preferably, the UE receives and obtains the information of the method that the neighboring cell sends the system information and/or the system information updating indication from the serving base station; the information of the method of sending the system information and/or the system information updating indication includes the time domain location and/or the frequency domain location and/or the power information and/or the scheduling information and/or the transmission and reception of encoding and decoding information for sending the system information and/or the system information updating indication; the transmission method includes the unicast RRC signaling and/or the broadcast message; further including that: the UE receives the system information and/or the system information updating indication from the neighboring target cell according to the obtained method of sending the system information and/or the system information updating indication.

Preferably, the serving cell is the source cell of the handover operation of the UE, and the neighboring cell is the target cell of the handover operation of the UE; and further, the source cell is the interference cell under a heterogeneous network scenario, and the target cell is the interfered cell under the heterogeneous network scenario.

The UE receives the system information and/or the system information updating indication of the serving cell from the serving cell, including that the UE receives the system information and/or the system information updating indication of the serving cell from the unicast message and/or the broadcast message of the serving cell; the system information and/or the system information updating indication include the information in the main System Information Block sent by the serving cell and/or the content in the System Information Block 1 sent by the serving cell and/or the difference or multiple relation between the system frame numbers of the serving cell and the neighboring cell; the unicast message includes the wireless connection reconfiguration message; and the broadcast message includes the broadcast message transmitted at other locations except the fixed location transmitted by the main System Information Block and the System Information Block 1 configured in the existing system, and further, the UE configured by the system obtains the method of receiving the broadcast message transmitted at other locations except the fixed location from the serving base station; the method for receiving the broadcast message includes the time domain location and/or the frequency domain location and/or the scheduling mechanism information and/or the encoding and decoding method transmitted by the broadcast message, further including that the UE obtains the method of receiving the broadcast message from the serving base station.

Preferably, the UE receives the indication and/or the judgment threshold sent by the base station and/or the UE judges the status based on whether it correctly receives the system information and/or the system information updating indication transmitted by the serving cell at the fixed location; the indication includes that the UE receives a clear signaling indication sent by the base station and/or the UE receives an indirect indication signaling sent by the base station; the indirect indication signaling further includes that: the UE receives the measurement constraint configuration information sent by the base station, and then it is determined that it cannot receive the system information and/or the system information updating indication transmitted by the serving cell at the fixed location; the judgment threshold includes the channel state of serving cell measured by the UE; further, when the UE determines that the status is the status that it cannot receive the system message transmitted by the serving cell at the fixed location, then the UE does not try to decode and receive the physical control channel and/or the downlink data sharing channel corresponding to the system message transmitted by the serving cell at the fixed location.

The UE determines and indicates the serving cell whether it is the status of receiving the system message transmitted by the serving cell at the fixed location in the broadcast method; the fixed location includes the time-frequency location that the serving cell sends the main system information and/or the system information updating indication block and/or the time domain and/or frequency domain location that the serving cell sends the System Information Block 1. The indication method includes that the UE indicates the status information to the serving base station by using the RRC signaling and/or the random access code.

When the serving base station receives the status indication that the UE can receive the system message broadcasted and transmitted by the serving cell at the fixed location, the serving base station no longer uses other unicast and/or broadcast message to send the system information and/or the system information updating indication to the UE; when the serving base station receives the status indication that the UE cannot receive the system message broadcasted and transmitted by the serving cell at the fixed location, the serving base station uses other unicast and/or broadcast message to send the system information and/or the system information updating indication to the UE.

The serving base station indicates the UE to receive the time domain location and/or the frequency domain location and/or the scheduling mechanism information of the broadcast message transmitted by the serving cell or the neighboring cell at other locations except the fixed location.

The UE receives the system frame number of the serving cell and/or the relation between the system frame numbers from the serving cell, and the relation between the system frame numbers is the difference or multiple relation between the system frame numbers of the serving cell and the neighboring cell; the UE calculates and obtains the current system frame number of the serving cell based on the received current system frame number of the neighboring cell and the relation between the system frame numbers; the method of the UE receiving the information from the serving cell is based on the RRC signaling and/or the broadcast message transmitted from other locations except the fixed location by the serving cell; and the RRC signaling message includes the wireless connection reconfiguration message.

The UE receives the system frame numbers of the serving cell and the neighboring cell, and reports the system frame numbers of the serving cell and the neighboring cell or the relation between the system frame numbers of the serving cell and the neighboring cell to the serving base station; the relation includes the difference and/or the multiple relation.

The current system frame numbers of the neighboring cells and/or the relation between the system frame numbers of the neighboring cells are transmitted between the base station and the neighboring base station, and the relation includes the difference and/or the multiple relation.

The configuration parameter of expanding the service range of the cell configured by the base station is transmitted between the base station and the neighboring base station, including the parameter reflecting the scale of cell range extension mechanism applied by the interfered cell and/or the cell-specific offset parameter for requesting the neighboring cell to control the UE handover and/or the version information of the cell and/or an indication of the information, which is transmitted by requesting the opposite cell, required by the UE receiving the system information and/or the system information updating indication of the present cell.

The UE indicates its capability that it can perform the interference elimination to the serving base station, and the interference elimination capability includes the interference elimination for the interference reference signal and/or the interference elimination for the neighboring physical broadcast channel.

The information transmitted by the physical broadcast channel and the transmission configuration information of the information are exchanged between base stations, including the downlink bandwidth, the PHICH configuration, and the physical frame number; the exchanging method is based on the public information transmitted in the X2 interface, including the X2 connection establishment request and/or the X2 connection establishment response and/or the base station configuration update and/or the base station configuration update response message.

The base station transmits the information transmitted by the physical broadcast channel of the neighboring base station to the UE, and the UE performs the interference elimination operation based on the received information transmitted in the physical broadcast channel of the neighboring base station, and it further receives the information transmitted by the physical broadcast channel of the serving cell; the base station includes the interfered base station, the neighboring base station includes the interference base station, and the information transmitted by the physical broadcast channel includes the deviation between the system frame numbers between the neighboring cells.

Based on the technical conception same or similar with the above-mentioned method embodiments, the present document further provides the following apparatus embodiments.

Embodiment Six

Figure 6:
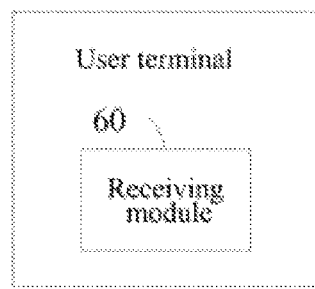
FIGS. 6-8 are structural diagrams of a user terminal provided by embodiment six of the present document.

The embodiment of the present document further provides a user equipment, as shown in FIG. 6, including:

a receiving module 60, configured to receive system information and/or system information updating indication of a serving cell and/or a neighboring cell according to system configuration.

Preferably, the receiving module 60 is configured to receive the system information and/or the system information updating indication of the serving cell and/or the neighboring cell from other locations except the fixed location configured by a system.

Figure 7:
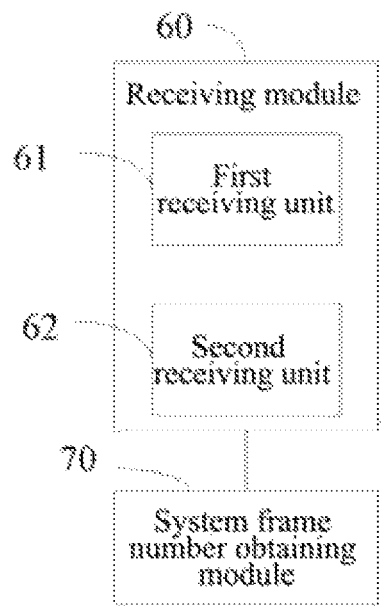

The fixed location is a fixed time domain location and/or a frequency domain location, configured by the system, for sending the system information; as shown in FIG. 7, the receiving module 60 includes:

a first receiving unit 61, configured to receive information of a method that a serving cell and/or a neighboring cell send the system information and/or the system information updating indication from the serving cell, and a second receiving unit 62, configured to receive the system information and/or the system information updating indication of the serving cell and/or the neighboring cell according to the information of the method that the serving cell and/or the neighboring cell send the system information.

The first receiving unit 61 is configured to: obtain the information of the method that the neighboring cell sends the system information and/or the system information updating indication from the serving cell based on a broadcast and/or a unicast RRC signaling; wherein, the information of the method of sending the system information and/or the system information updating indication comprises: the time domain location and/or the frequency domain location and/or power information and/or scheduling information and/or transmission and reception of encoding and decoding information for sending the system information and/or the system information updating indication.

As shown in FIG. 7, the user equipment further includes: a system frame number obtaining module 70, configured to:

receive a system frame number of the neighboring cell from the serving cell; and/or receive a relation between a system frame number of the serving cell and the system frame number of the neighboring cell from the serving cell, and obtain the system frame number of the neighboring cell according to the relation and the system frame number of the serving cell; and/or receive a correction parameter required by calculating the system frame number of the neighboring cell from the serving cell, correct the relation between the system frame number of the serving cell and/or the system frame number of the neighboring cell according to the correction parameter, and obtain the system frame number of the neighboring cell. The first receiving unit 61 is configured to: when the system information is sent in a broadcast method, receive the time domain location and/or the frequency domain location and/or the power information and/or the scheduling information and/or the transmission and reception of encoding and decoding information transmitted by the system information from the serving cell.

The system frame number obtaining module 70 receives the system frame number of the serving cell and/or the relation between the system frame number of the serving cell and the system frame number of the neighboring cell and/or the correction parameter required by calculating the system frame number of the neighboring cell from the serving cell, including: receiving the system frame number of the serving cell and/or the relation between the system frame number of the serving cell and the system frame number of the neighboring cell and/or the correction parameter required by calculating the system frame number of the neighboring cell from a broadcast message and/or a RRC signaling message sent by a serving base station.

The first receiving unit 61 is configured to: when the system information is sent in a broadcast method, receive the time domain location and/or the frequency domain location and/or the power information and/or the scheduling information and/or the transmission and reception of encoding and decoding information transmitted by the system information from the serving cell.

Figure 8:
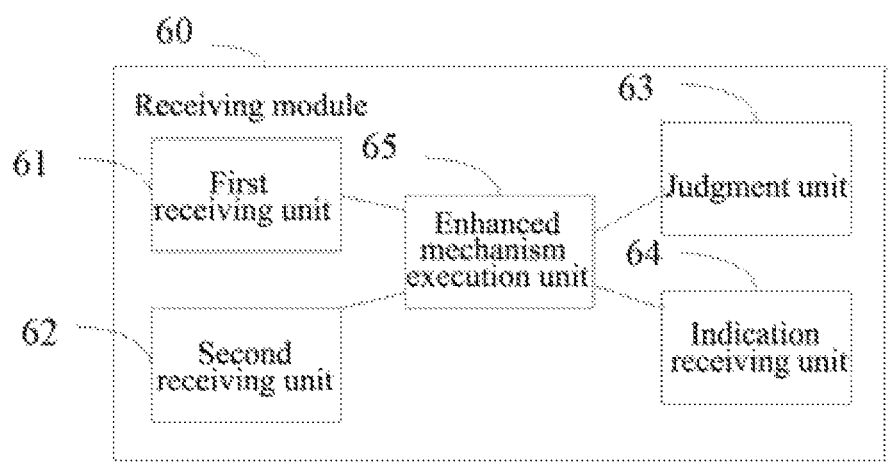

As shown in FIG. 8, the user equipment further includes a judgment unit 63, configured to: judge whether a user terminal needs to perform the enhanced reception mechanism of system information, and/or an indication receiving unit 64, configured to: receive the indication information of the serving base station whether the user equipment needs to perform the enhanced reception mechanism of system information;

the first receiving unit 61 is configured to: when determining that the user equipment needs to perform the enhanced reception mechanism of system information or receiving the indication information that the enhanced reception mechanism of system information needs to be performed, receive the system information at other locations except the fixed location configured by the system; and/or, when determining that the user equipment does not need to perform the enhanced reception mechanism of system information or receiving the indication information that enhanced reception mechanism of system information does not need to be performed, receive the system information at the fixed location configured by the system.

The judgment unit 63 is configured to:

measure the channel state; if a measurement result is lower than a preset fifth threshold value, then determine that the enhanced reception mechanism of system signal is required to be performed; and if the measurement result is higher than a preset sixth threshold value, then determine that the enhanced reception mechanism of system signal is not required to be performed; or when the probability that the user equipment decodes the system information transmitted by the serving cell at the fixed location successfully is lower than a first probability threshold, then determine that the enhanced reception mechanism of system signal is required to be performed; when the probability that the user equipment decodes the system information transmitted by the serving cell at the fixed location successfully is higher than a second probability threshold, then determine that the enhanced reception mechanism of system signal is not required to be performed.

It further includes:

an enhanced mechanism execution unit 65, configured to: when the user equipment performs the enhanced reception mechanism of system information, notify the first receiving unit to receive the system information at other locations except the fixed location, and receive the system information at the fixed location, or not try to decode and receive the system information sent at the fixed location.

Embodiment Seven

Figure 9:
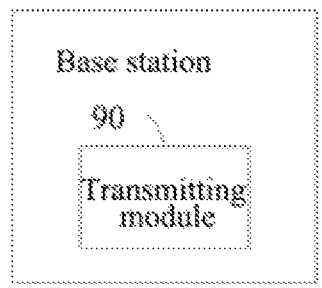
FIGS. 9-10 are structural diagrams of a base station provided by embodiment seven of the present document.

The embodiment of the present document further provides a base station, as shown in FIG. 9, including:

a transmitting module 90, configured to: send system information and/or system information updating indication of a neighboring cell and/or a serving cell of the user equipment to the user equipment according to the system configuration.

Preferably, the transmitting module 90 is configured to: send the system information and/or the system information updating indication of the serving cell and/or the neighboring cell of the user equipment from other locations except the fixed location configured by the system to the user equipment.

The transmitting module 90 is configured to: send information of a method of the system information and/or the system information updating indication of the serving cell and/or the neighboring cell of the UE to the UE based on a broadcast and/or a unicast RRC signaling; wherein, the information of the method of sending the system information and/or the system information updating indication comprises: the time domain location and/or the frequency domain location and/or power information and/or scheduling information and/or transmission and reception of encoding and decoding information for sending the system information and/or the system information updating indication.

Figure 10:
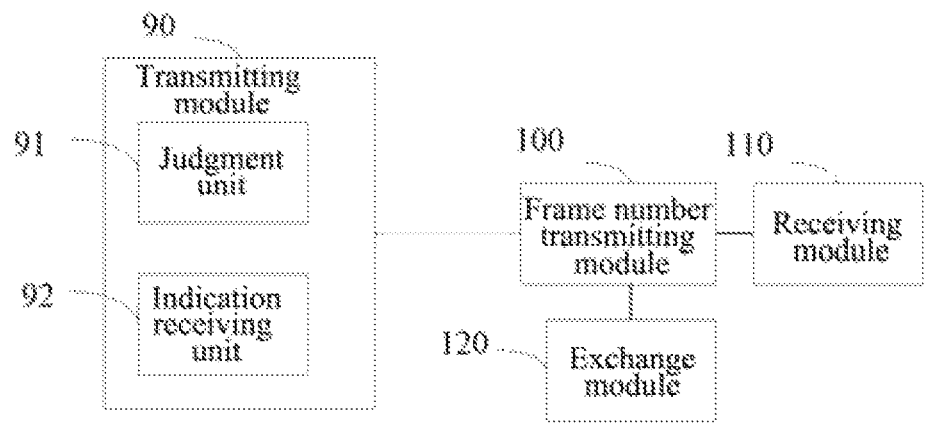

As shown in FIG. 10, it further includes:

a frame number transmitting module 100, configured to: send a system frame number of the neighboring cell to the UE; and/or a relation between a system frame number of the serving cell and the system frame number of the neighboring cell; and/or a correction parameter required by calculating the system frame number of the neighboring cell.

It further includes:

a receiving module 110, configured to: receive the system frame numbers of the serving cell and the neighboring cell reported by the UE, and/or report the relation between the system frame numbers of the serving cell and the neighboring cell to the serving base station; wherein, the relation comprises a difference and/or multiple relation.

It can further include an exchange module 120, configured to: between the neighboring base stations, transmit the current system frame numbers between the neighboring cells and/or the relation between the system frame numbers of the neighboring cells, wherein, the relation comprises the difference and/or multiple relation.

The transmitting module 90 is configured to:

when the system information is sent in a broadcast method, send the time domain location and/or the frequency domain location and/or power information and/or scheduling information and/or transmission and reception of encoding and decoding information transmitted by the system information to a user equipment.

It further includes a judgment unit 91, configured to: judge whether the UE needs to perform an enhanced reception mechanism of system information, and/or an indication receiving unit 92, configured to: receive the indication information of the UE whether the UE needs to perform the enhanced reception mechanism of system information.

The judgment unit 91 is configured to:

receive the measurement result of a channel state of the UE, wherein, the measurement result comprises a measurement result of a RRM and/or a RLM and/or a CQI and/or a SNR and/or a SINR of the serving base station; when the measurement result is lower than a first threshold value configured by the system, determine that the UE needs to perform the enhanced reception mechanism of system information; when the measurement result is higher than a second threshold value configured by the system, determine that the UE does not need to perform the enhanced reception mechanism of system information; alternatively, when the data transmission and reception success rate of the UE is lower than a third threshold value configured by the system, determine that the UE needs to perform the enhanced reception mechanism of system information; and when the data transmission and reception success rate of the UE is higher than a fourth threshold value configured by the system, determine that the UE does not need to perform the enhanced reception mechanism of system information.

By using the apparatus provided by the embodiments of the present document, the user equipment can receive the system information from other locations except the fixed location configured by the system, thereby solving the problem in the related art that the user equipment cannot obtain the system information due to interference in the system information at the fixed location.

Embodiment Eight

Figure 11:
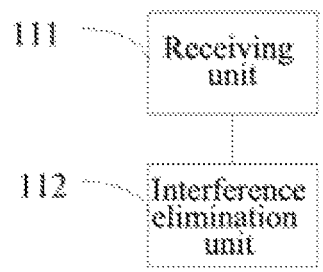
FIGS. 11-12 are structural diagrams of a user terminal provided by embodiment eight of the present document.

The embodiment of the present document further provides a user equipment, as shown in FIG. 11, including:

a receiving unit 111, configured to: receive auxiliary information required by an interference elimination operation from a serving cell; and an interference elimination unit 112, configured to: perform the interference elimination operation during an operation of receiving system information according to the auxiliary information.

Figure 12:
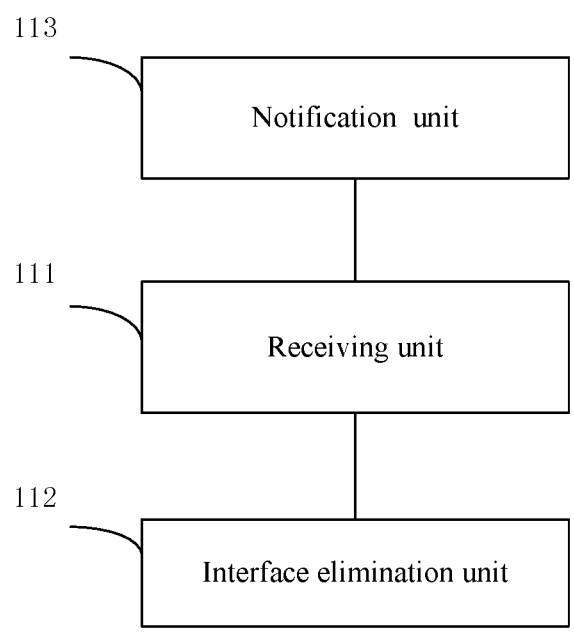

As shown in FIG. 12, it further includes:

a notification unit 113, configured to: notify an interference elimination capability of the UE to a serving base station.

The interference elimination capability comprises an interference elimination capability when the UE performs reception of system information; and the notification unit 113 is configured to:

indicate the capability through adding indication information in a signaling message which carries the indication information of the UE capability; wherein, the indication information comprises adding a new information element for indication and/or a method of expanding the meaning of the existing information element for indication, wherein, the signaling message comprises a capability information message of the UE; and/or after receiving the signaling message sent by the base station, inform the base station of the capability of UE by a response message, wherein, the response message comprises an existing and/or newly-added RRC signaling message and/or a random access sequence code; and/or send a signaling of the auxiliary information required by requesting to perform the interference elimination operation to the base station, to notify the base station that the UE has the interference elimination capability.

The auxiliary information comprises information transmitted by a neighboring interference cell in a physical broadcast channel and corresponding configuration information;

the interference elimination unit 112 is configured to:

remove an interference signal sent by the neighboring interference cell from the received signal according to the information transmitted by the neighboring interference cell in the physical broadcast channel and the corresponding configuration information.

The receiving unit 111 is configured to: receive the information transmitted by the physical broadcast channel of the neighboring base station which is transmitted by the base station; and correspondingly, the interference elimination unit 112 is configured to: perform the interference elimination operation based on the received information transmitted in the physical broadcast channel of the neighboring base station.

The above description is only the preferred embodiments of the present document and is not intended to limit the protection scope of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

INDUSTRIAL APPLICABILITY

By using the method and apparatus provided by the embodiments of the present document, the user equipment can receive the system information from other locations except the fixed location configured by the system, thereby solving the problem in the related art that the user equipment cannot obtain the system information due to interference in the system information at the fixed location.

What we claim is:

1. A method for receiving system information, comprising:

a user equipment (UE) receiving the system information or system information updating indication of a serving cell or a neighboring cell from other locations except a fixed time domain and frequency domain location have fixedly configured by a system; wherein the fixed time domain and frequency domain location are configured by the system, for sending the system information or the system information updating indication;

the UE receiving information of a mode that the serving cell or the neighboring cell sends the system information or the system information updating indication from the serving cell, and receiving the system information or the system information updating indication of the serving cell or the neighboring cell according to the information of the mode that the serving cell or the neighboring cell sends the system information or the system information updating indication;

the information of the mode that the UE receives the system information or the system information updating indication sent by the service cell from the serving cell comprises:

when a serving base station determines that the UE needs to perform an enhanced reception mechanism of the system information, the serving base station indicating the UE to receive the system information or the system information updating indication at the other locations except the fixed time domain and frequency domain location configured by the system, or when the UE determines that the UE needs to perform an enhanced reception mechanism of the system information, the UE indicating the serving base station that the UE receives the system information or the system information updating indication at the other locations except the fixed time domain and frequency domain location configured by the system;

and/or, when the serving base station determines that the UE does not need to perform the enhanced reception mechanism of the system information, the serving base station indicating the UE to receive the system information or the system information updating indication at the fixed time domain and frequency domain location configured by the system, or when the UE determines that the UE does not need to perform the enhanced reception mechanism of the system information, the UE indicating the serving base station that the UE receives the system information or the system information updating indication at the fixed time domain and frequency domain location configured by the system.

2. The method according to claim 1, wherein, the UE receives the system information or the system information updating indication from the fixed time domain and frequency domain location based on the broadcast RRC signaling, and the UE receives the system information or the system information updating indication from locations except the fixed time domain and frequency domain location based on the broadcast or unicast RRC signaling.

3. The method according to claim 1, further comprising: transmitting a configuration parameter for expanding a service range of cell configured by the base station between the serving base station and the neighboring base station, which comprises a parameter reflecting scale of cell extension range mechanism applied by a interfered cell or a cell-specific offset parameter or version information of base station for requesting the neighboring cell to control a UE handover or an indication for requesting the opposite cell to transmit information, required by the UE receiving the system information or the system information updating indication of present cell.

4. The method according to claim 1, further comprising: among base stations, exchanging information transmitted by a physical broadcast channel and transmission configuration information of the information between the base stations, comprising a downlink bandwidth or physical feedback channel (PHICH) configuration or physical frame number.

5. The method according to claim 4, an exchange among the base stations is based on public information in an X2 interface, comprising an X2 connection establishment request or an X2 connection establishment response and a base station configuration update or a base station configuration update response message.

6. A user equipment, comprising a processor, and a storage device for storing computer executable instructions that when executed by the processor cause the processor to perform the steps in following modules:

a receiving module, configured to receive system information or system information updating indication of a serving cell or a neighboring cell from other locations except a fixed time domain and a fixed frequency domain location have fixedly configured by a system; wherein the fixed time domain and the frequency domain location configured by the system for sending the system information;

the receiving module comprises:

a first receiving unit, configured to receive information of a mode that the serving cell or the neighboring cell send the system information and the system information updating indication from the serving cell;

a second receiving unit, configured to receive the system information or the system information updating indication of the serving cell or the neighboring cell according to the information of the mode that the serving cell or the neighboring cell send the system information;

wherein, the receiving module is configured to receive the system information or the system information updating indication from the fixed time domain and frequency domain location based on a broadcast radio resource control (RRC) signaling, and receive the system information or the system information updating indication from a location except the fixed time domain and frequency domain location based on a broadcast or a unicast RRC signaling.

7. The user equipment according to claim 6, wherein the first receiving unit is configured to: when the system information is sent in a broadcast mode, receive a time domain location and a frequency domain location, or power information, or scheduling information, or transmission and reception of encoding and decoding information, transmitted by the system information from the serving cell.

8. The user equipment according to claim 6, further comprising:

an enhanced mechanism execution unit, configured to: notify the first receiving unit to receive the system information at the other locations except the fixed time domain and frequency domain location when the user terminal performs the enhanced reception mechanism of the system information, and receive the system information at the fixed time domain and frequency domain location, or not try to decode the received system information sent at the fixed time domain and frequency domain location.

9. A base station, comprising a processor, and a storage device for storing computer executable instructions that when executed by the processor cause the processor to perform the steps in following modules:
- a transmitting module, configured to send system information or system information updating indication of a serving cell or a neighboring cell from other locations except a fixed time domain and frequency domain location have fixedly configured by a system to a user equipment (UE);
- a receiving module, configured to receive the system frame numbers of the serving cell and the neighboring cell reported by the UE, or the relation between the system frame numbers of the serving cell and neighboring cell reported by the UE; wherein the relation comprises a difference or multiple relation;
- a judgment unit, configured to judge whether the UE needs to perform an enhanced reception mechanism of the system information, or an indication receiving unit, configured to receive indication information of the UE whether the UE needs to perform the enhanced reception mechanism of the system information.

10. The base station according to claim 9, further comprising:
- an exchange module, configured to: between the neighboring base stations, transmit the current system frame numbers between the neighboring cells or the relation between the system frame numbers of the neighboring cells, wherein, the relation comprises a difference or multiple relation.

11. The base station according to claim 9, wherein, the judgment unit is configured to:
- receive a measurement result of a channel state of the UE, wherein, the measurement result of the channel state of the UE comprises a measurement result of a radio resource management (RRM) or a radio link management (RLM) or a channel quality indication (CQI) or a signal-to-noise ratio (SNR) or a signal to interference plus noise ratio (SINR) of the serving base station;
- when the measurement result of the channel state of the UE is lower than a first threshold value configured by the system, determine that the UE needs to perform the enhanced reception mechanism of the system information;
- when the measurement result of the channel state of the UE is higher than a second threshold value configured by the system, determine that the UE does not need to perform the enhanced reception mechanism of the system information; alternatively, when a data transmission and reception success rate of the UE is lower than a third threshold value configured by the system, determine that the UE needs to perform the enhanced reception mechanism of the system information; and
- when the data transmission and reception success rate of the UE is higher than a fourth threshold value configured by the system, determine that the UE does not need to perform the enhanced reception mechanism of the system information.

12. The method according to claim 1, wherein the serving base station judges whether the UE needs to perform the enhanced reception mechanism of the system information according to a measurement result of a channel state of the UE, comprising:
- the serving base station receiving the measurement result of the channel state of the UE, wherein the measurement result of the channel state of the UE comprises a measurement result of a radio resource management (RRM) or a radio link management (RLM) or a channel quality indication (CQI) or a signal-to-noise ratio (SNR) or a signal to interference plus noise ratio (SINR) of the serving base station; when the measurement result of the channel state of the UE is lower than a first threshold value configured by the system, the serving base station determines that the UE needs to perform the enhanced reception mechanism of the system information; when the measurement result of the channel state of the UE is higher than a second threshold value configured by the system, the serving base station determines that the UE does not need to perform the enhanced reception mechanism of the system information; alternatively, when a data transmission and reception success rate of the UE is lower than a third threshold value configured by the system, the serving base station determines that the UE needs to perform the enhanced reception mechanism of the system information; and when the data transmission and reception success rate of the UE is higher than a fourth threshold value configured by the system, the serving base station determines that the UE does not need to perform the enhanced reception mechanism of the system information;
- wherein the UE determines that the UE needs to perform the enhanced reception mechanism of the system information, comprising:
  - the UE measuring the channel state; if the measurement result of the channel state of the UE is lower than a preset fifth threshold value, then determining that an enhanced reception mechanism of system signal is required to be performed; and if the measurement result of the channel state of the UE is higher than a preset sixth threshold value, then determining that the enhanced reception mechanism of system signal is not required to be performed; or
  - when a probability that the UE decodes the system information transmitted by the serving cell at the fixed time domain and frequency domain location successfully is lower than a first probability threshold, then determining that the enhanced reception mechanism of system signal is required to be performed; when the probability that the UE decodes the system information transmitted by the serving cell at the fixed time domain and frequency domain location successfully is higher than a second probability threshold, then determining that the enhanced reception mechanism of system signal is not required to be performed.

* * * * *